No. 879,236.

PATENTED FEB. 18, 1908.

W. H. BARTHOLOMEW.
DISTILLING APPARATUS.
APPLICATION FILED FEB. 3, 1906.

Witnesses:
S. Chas. Yeaton.
Hiram Jenkins.

Inventor
Walter H. Bartholomew,
by Schreiter & Mathews,
his Att'ys

No. 879,236. PATENTED FEB. 18, 1908.
W. H. BARTHOLOMEW.
DISTILLING APPARATUS.
APPLICATION FILED FEB. 3, 1906.

Witnesses
S. Herzog
S. Chas. Yeaton.

Inventor
Walter H. Bartholomew
By his Attorneys
Schreiter & Mathews

No. 879,236. PATENTED FEB. 18, 1908.
W. H. BARTHOLOMEW.
DISTILLING APPARATUS.
APPLICATION FILED FEB. 3, 1906.

Witnesses
S. Herzog
S. Chas. Yeaton.

Inventor
Walter H. Bartholomew
By his Attorneys
Schreiter & Mathews

UNITED STATES PATENT OFFICE.

WALTER H. BARTHOLOMEW, OF EAST ORANGE, NEW JERSEY, ASSIGNOR TO CHARLES B. HILL, TRUSTEE, OF MONTGOMERY, NEW YORK.

DISTILLING APPARATUS.

No. 879,236.   Specification of Letters Patent.   Patented Feb. 18, 1908.

Application filed February 3, 1906. Serial No. 299,315.

*To all whom it may concern:*

Be it known that I, WALTER H. BARTHOLOMEW, of East Orange, county of Essex, and State of New Jersey, have invented certain new and useful Improvements in Distilling Apparatus, of which the following is a full, clear, and exact specification, reference being had to the accompanying drawings, wherein—

My invention relates to apparatus for distilling water and consists of the hereinafter described apparatus embodying improvements in construction and such combinations of the parts whereby an apparatus is obtained which is self-contained, absolutely automatic, and very economical in its operation.

My improved water distilling apparatus comprises a steam boiler, an evaporator for the water to be distilled, one or more condensers, a connection with a water supply and the intermediate connections and accessories as hereinafter more fully described, all parts being arranged substantially as shown in the drawings. The steam boiler A is preferably of the vertical type of tubular boiler, though any other type of boiler may be used. At one side of the boiler the receptacle B for feed water to the boiler is set up, and connected with it by pipe $a$. The feed water receptacle B must be provided with an overflow, because the quantity of water overflowing from the condensers, from which it receives its supply of feed water for the boiler, approximates about four times the quantity of water required for the feeding of the boiler, the consumption of the water for the boiler being only slightly in excess of the quantity of distilled water produced, whereas the consumption of water for cooling the condensers is not less than four times the quantity of the water distilled. The water is fed from the receptacle B into the boiler under pressure by an injector or pump.

The evaporator C is preferably a cylindrical vessel in the shape of a boiler having a steam dome D superimposed thereon and a suitable capacity for responding to the intended use and required capacity of the apparatus. Its bottom is preferably made slanting toward its center, where the outlet pipe $q$ is set, to enable the evaporator to be emptied when cleaning or repairs are necessary. The outlet pipe $q$ is provded with a stopcock $q'$ and with means of affixing thereto a flexible hose, if necessary. In the interior of the evaporator a coil $c$ is arranged some distance above the bottom thereof and so that the upper layer of the coil is approximately on the level of the water within the evaporator. The upper end of this coil is connected by pipes $d$, $d'$, $d^2$, with the steam boiler A and a valve $d^3$ is provided in suitable position in this connection. If a boiler of the tubular type is used wherein the water circulates in tubes, the pipe $d^2$ may connect with the terminal of the tubes or steam chamber of the boiler.

The lower end of coil $c$ connects by a bend $c'$ and pipe $f$ with steam trap E, the termini of both being secured by flanges $e$ to the shell of the evaporator. Steam trap E, which may be of any suitable construction, is connected by pipes $g$, $g'$ and $g^2$ with the feed water receptacle F, which latter is in turn connected by pipe $h$ with the interior of the evaporator C. The steam trap, employed in the apparatus, is shown in the sectional views in Figs. 1 and 3. The pot 1, closed by cover $1^a$, is divided into two chambers, the chamber designated 2 in the drawing, being separated from the remaining portion of the pot by flange $2^a$, extending from the upper rim of the pot to within a short distance of the bottom. The space between the lower edge of flange $2^a$ and the bottom of the pot 1 affords means of communication between the two chambers. A third chamber, designated 3 in the drawings, is formed by suitably shaping a part of the upper portion of the pot and the adjoining portion of the cover. This chamber 3 communicates with the interior of the pot 1 by pipe 4 tapped and screwed in the bottom of chamber 3 and terminating some distance above the bottom of the pot 1. In the upper end of pipe 4, a valve 5 is fitted, connected by stem 6, to lever 7, fulcrumed in a lug secured to, or made integral with, the pipe 4. The other end of lever 7 is connected to a float 8. Pipe $f$, connecting with the lower end of the coil $c$, is tapped into chamber 2, and pipe $g$, connecting with the feed water apparatus, is tapped into chamber 3. The dimensions of the steam trap must be proportioned to the size of the apparatus, and the float 8 should have at least sufficient buoyancy to overcome, at all times, the pressure of the water upon valve 5, tending to keep the valve closed when the apparatus is in action.

Figure 4:
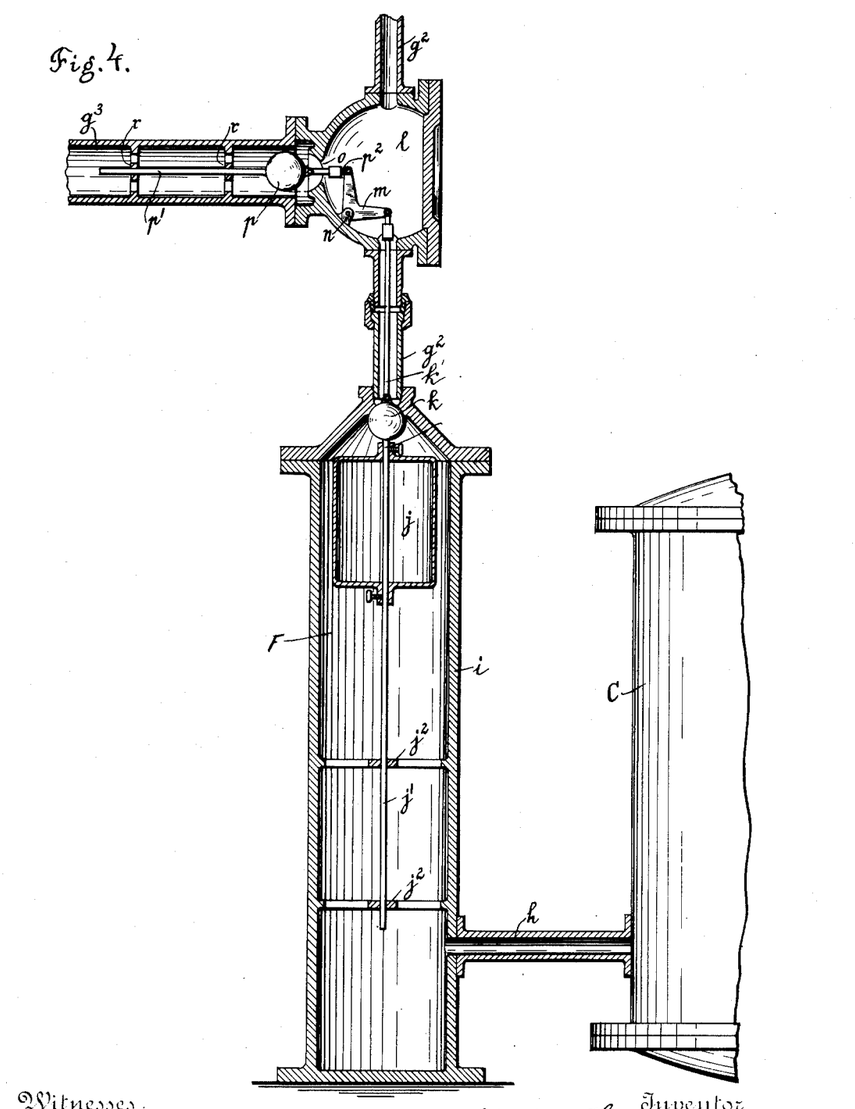
Fig. 4 is a sectional view of the feeding apparatus for the evaporator.

The operation of the trap, to keep steam in the coil $c$ and to force the water, resulting from condensation in the steam, through pipes $g$, $g'$, and $g^2$ and into the feed water apparatus, is as follows:—Assuming at the starting of the apparatus, the steam trap to be empty, the steam will flow from the coil $c$ through pipe $f$, into chamber 2, and fill the pot, gradually condensing there. The float 8 lies then on the bottom of the pot and valve 5 is held closed, thus preventing the escape of steam from the trap. When the water, produced by the condensation of the steam, reaches a level above the lower edge of the flange $2^a$, the chamber 2 is separated from the interior of the pot, as far as steam communication is concerned, and then only water condensed from the steam in coil $c$ will flow into the trap. When the level of the water in the trap rises above the line, set for maintaining valve 5 in closed position, the float 8, driven by its buoyancy, will swing lever 7 on its fulcrum, and thereby withdraw valve 5 from its seat, thus admitting the water from the steam trap into the chamber 3. The flow of this water is forced in by the pressure of the steam in coil $c$. When, by thus forcing the water through pipe 4 into chamber 3, the level thereof is reduced in the steam trap, float 8 sinks, the valve 5 is closed by the pressure of the water upon it, the inflow of water into chamber 3 ceases until again a sufficient quantity of water has accumulated in the trap to raise float 8 to open valve 5 when the forcing of water into pipe $g$ is repeated. This will occur a few times at the starting of the apparatus until the circulation is completed, whereupon the action of the trap will produce a continuous flow of the water as it condenses through the steam trap into pipe $g$, $g'$ and $g^2$, and through the feed apparatus into the evaporator C. The static pressure of the column of water in pipe $g$, upon valve 5, is not sufficient to overcome the pressure of the steam upon the water in the steam trap. The evaporator C may also be provided with an inlet for charging it with water at the beginning of the distilling operation. In my improved apparatus I effect this by connecting the pipe $g$ (by pipe $w w'$) to the pipe $w w$ supplying the cooling water to the jackets of the condensers; pipe $w w'$ is then provided with suitable stopcock, as shown in the drawing. The position of steam coil $c$, at or near the level of the water in evaporator C and the arrangement of the connection of live steam supply piped with the uppermost layer of the coil is devised to secure the most economical utilization of the steam for evaporating a proportionately large quantity of water. The construction of this feed apparatus F is shown more in detail in the enlarged sectional view in Fig. 4. It comprises a cylindrical vessel $i$ with a float $j$ loosely fitted in and corresponding in shape with the outer vessel $i$. To secure a smooth working of the float and to prevent its coming into frictional contact with the interior walls of the vessel $i$, the float is provided with stem $j'$ passing through the centers of spiders $j^2$. The size of the float is calculated to give it sufficient buoyancy to perform the functions for which it is employed, as will be explained further on.

The float $j$ carries on its upper end a spherical valve $k$, preferably set upon a stem $k'$, as shown in the drawing. This stem is extended through the pipe $g^2$ into the valve chamber $l$ and is there connected to one arm of the bell crank lever $m$ fulcrumed on lug $n$, integral with, or secured to, the casting composing the valve chamber $l$. The valve chamber $l$ is open at $o$, a suitable valve seat being provided there and a flange for connecting thereto the outlet pipe $q^3$. In this valve seat another spherical valve $p$ is located, set on stem $p'$ projecting into pipe $g^3$, where it is guided by being passed through the centers of spiders $r$. Stem $p^2$, projecting into the valve chamber $l$ and suitably connected to the other arm of bell crank lever $m$, transmits the motions of float $j$ to valve $p$. The connections of the valves $k$ and $p$ with the arms of the bell crank lever $m$ are adjustable and are so set that both valves are operated simultaneously by the action of the float $j$; that is to say, when the float $j$ rises, valve $k$ is moved into its seat to close the inflow into receptacle F from pipe $g^2$ and simultaneously valve $p$ is moved from its seat to open outlet $o$ from the valve chamber. Float $j$ is sufficiently heavy to effect, by its own weight, the opening of valve $k$ and the closing of the valve $p$ when the supply of feed water in receptacle F sinks below its requisite level.

The normal position of the float $j$ in the vessel $i$ is determined to correspond with the level of the water in evaporator C as may be required. Though the pressure of the vapors in the evaporator is quite a negligible factor, it is safer to determine the position of the float in receptacle F so that valve $k$ is not closed before the desired or predetermined level of feed water in evaporator C is reached. When the float $j$ arises to a position causing valve $k$ to close pipe $g^2$, the above described mechanism simultaneously opens valve $p$ in outlet pipe $g^3$. While the float $j$ is in this position, the water escapes through pipe $g^3$. As soon, however, as the supply of the water in the evaporator is reduced, it sinks correspondingly in the receptacle F, float $j$ drops down, opens pipe $g^2$, closing at the same time pipe $g^3$, and then the water from pipe $g^2$ flows into vessel $i$ until again the feed water in evaporator C reaches the predetermined or desired level. The length or height of the vessel $i$ must be sufficient to permit the determination of the position of float $j$ at such level that the height of the column of feed water within the vessel $i$ will be sufficient to overcome whatever steam pressure there may be within the evaporator C so as to maintain the level of the water within the evaporator slightly (about two inches) above the level of the uppermost layer of the steam coil. The levels of the water in the evaporator C and receptacle F are approximately as shown in shaded lines in Fig. 1. The level of water in the receptacle F is held somewhat above that in the evaporator C, to overcome the slight pressure of the vapor therein. Float $j$ should be so set upon the rod $j'$ in position to cause the valve $k$ to close the port, when the water in the evaporator C rises to the predetermined level. By these means the supply and consumption of water in the evaporator are constantly balanced, a steady flow of vapor furnished to the condensers, and all possible waste of live steam or fuel avoided.

Figure 1:
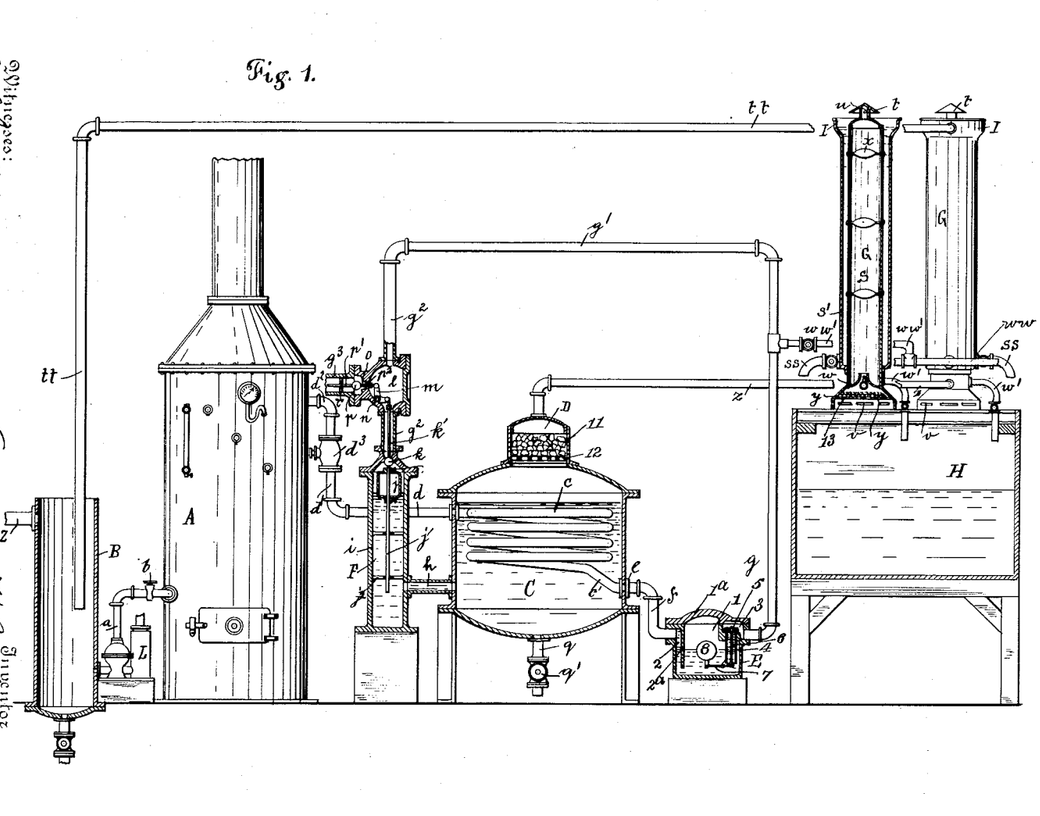
Figure 1 is an elevation, partly sectional view, of the entire apparatus.
Figure 3:
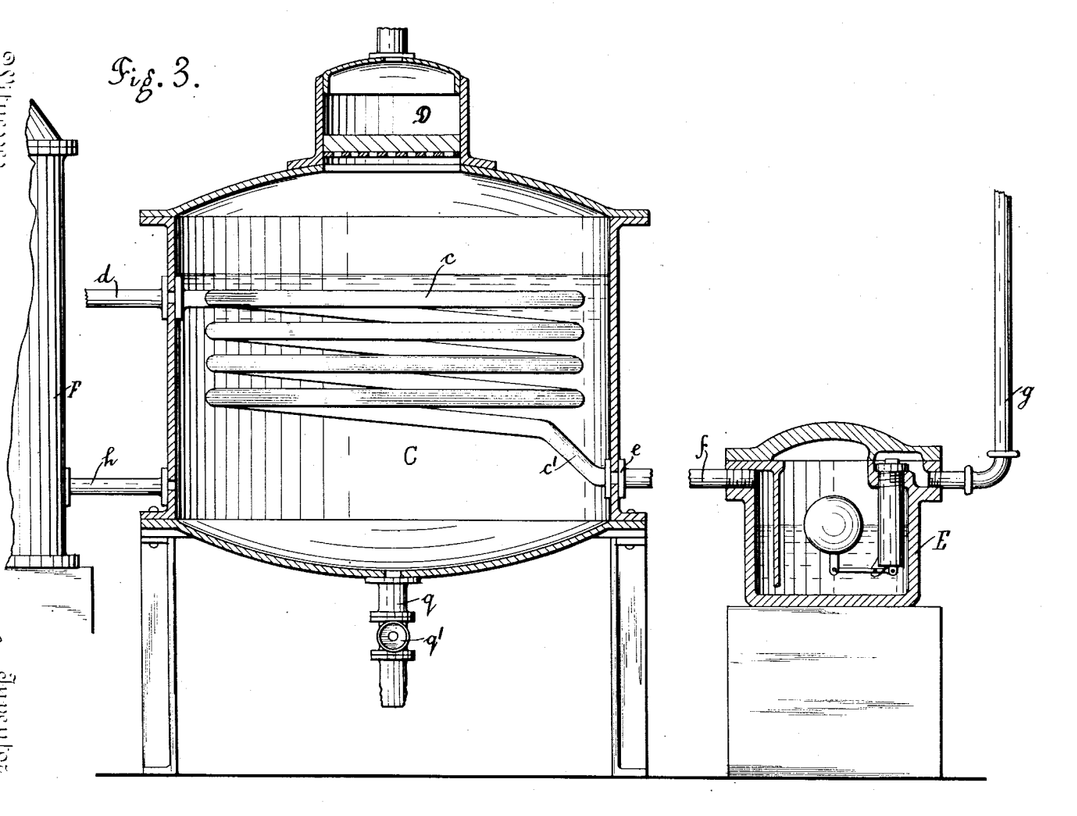
Fig. 3 is an elevation, partly sectional view, of the evaporator and its accessories.

It is desirable to provide a steam filter in the dome D of the evaporator C. Such filter is preferably made up of broken pieces of porous calcined mineral substances—broken clay fire bricks, porcelain, porous sand stone, or of suitable kinds of artificial stone and the like, as shown in Figs. 1 and 3. The filtering substance 11 is supported upon the perforated screen 12.

One or more steam condensers may be used in my improved apparatus. It is preferable to use two or more because such greater distribution results in a more rapid condensation of vapors and a more effective elimination of gases and vapors of volatile liquids, as may be contained in the water. It is also preferable to use condensers constructed as set forth in my application for United States Letters Patent, filed May 8, 1905, Serial Number 259362, patented Sept. 25, 1906, No. 831,593. It, however, is not essential for the attaining of the object of the invention herein set forth to either use two or more condensers, or condensers of the particular construction as set forth in my aforerecited application.

Figure 5:
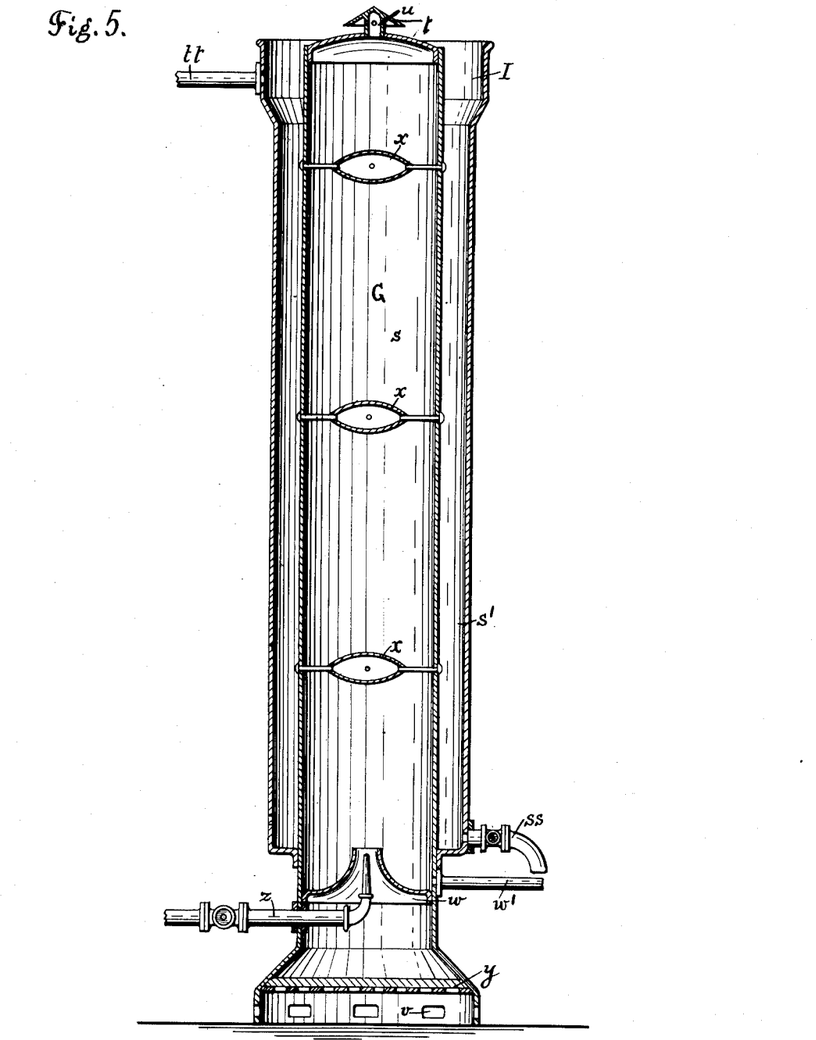
Figs. 5, 6 and 7 are detail views.
Figures 6, 7:
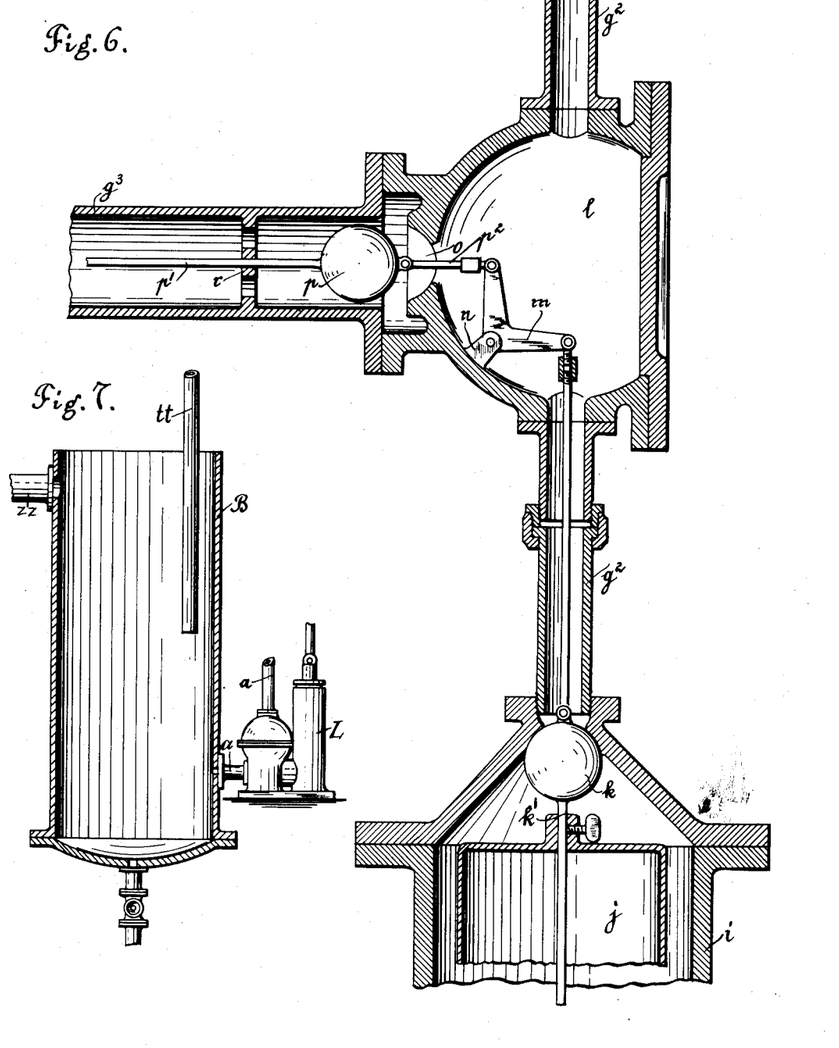
Figure 8:
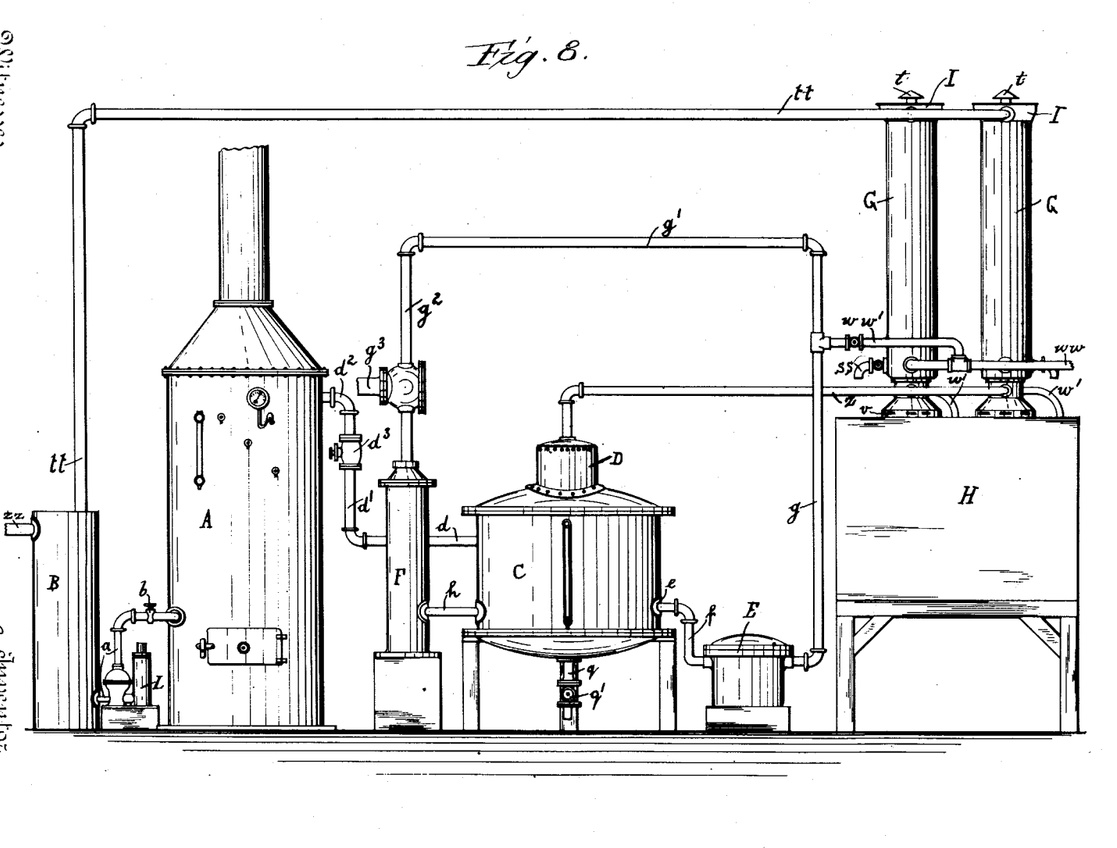
Fig. 8 is an elevation of the entire apparatus, showing an outside view thereof.

In the accompanying drawings two condensers G are shown set up upon a platform over tank or receptacle H. Their construction is shown in detail in the enlarged sectional view, Fig. 5. Each of the condensers G consists of a comparatively long (high) cylindrical vessel $s$ having its upper end closed by a hood $t$, provided with suitably located apertures $u$ for the escape of gases and vapors of volatile liquids that may enter the condenser with the vapors of water. In the base of each condenser G suitable apertures $v$ are provided for admission of atmospheric air into the condenser to effect the aerating of the water as it is being condensed. A filter $y$ made of suitable material is set upon the perforated screen 13, located in the base of the condenser above the air ports $v$ as it is very desirable to filter the air entering the condenser and to prevent contamination of the water by impurities. Some distance above the apertures $v$ an inwardly deflected flange $w$ is situated in the interior of the vessel $s$, forming a funnel shaped inlet into the interior of the condenser and also a receptacle for the distillate as the vapors are condensed. The nozzle of the steam conduit $z$, connecting the condensers with the dome D of the evaporator, is so located directly underneath the deflected flange $w$ that the flow of the steam into the condenser is directed into the funnel shaped opening. The object of this arrangement is to create suction whereby the air, entering through apertures $v$, is drawn into the condenser.

One or more deflectors $x$ are set in the interior of vessel $s$, above the inlet port of the steam, to divert the flow of the steam in contact with the walls of the vessel $s$ whereby the process of condensation is accelerated. Vessel $s$ is tapped at or slightly above the bottom of flange $w$ by pipe $w'$, provided with a suitable stopcock and leading into tank H and through which the distilled water is drawn from the condenser and accumulated in the said tank.

Each condenser is inclosed in a watertight jacket $s'$ and in this jacket a branch of the cold water conduit $w\,w$ is tapped. The cooling water enters the jacket at or near the base of the condenser and supplies a steady stream of water for cooling exteriorly the wall of vessel $s$. The water jackets $s'$ are tapped at or near the bottoms thereof by pipes $s\,s$, provided with suitable stopcocks and serving for the discharge from the jackets of accumulations of sediment. These jackets $s'$ extend the whole length of vessels $s$ and terminate into suitably shaped heads I, preferably somewhat larger in diameter, and connected together and to the feed water receptacle B by water conduit $t\,t$. This feed water receptacle B is a suitable vessel, provided with an overflow outlet $z\,z$ and connected by pipe $a$ with a pump or injector L by which the feed water is driven into the boiler A in the manner usually employed in feeding water into steam boilers.

Figure 2:
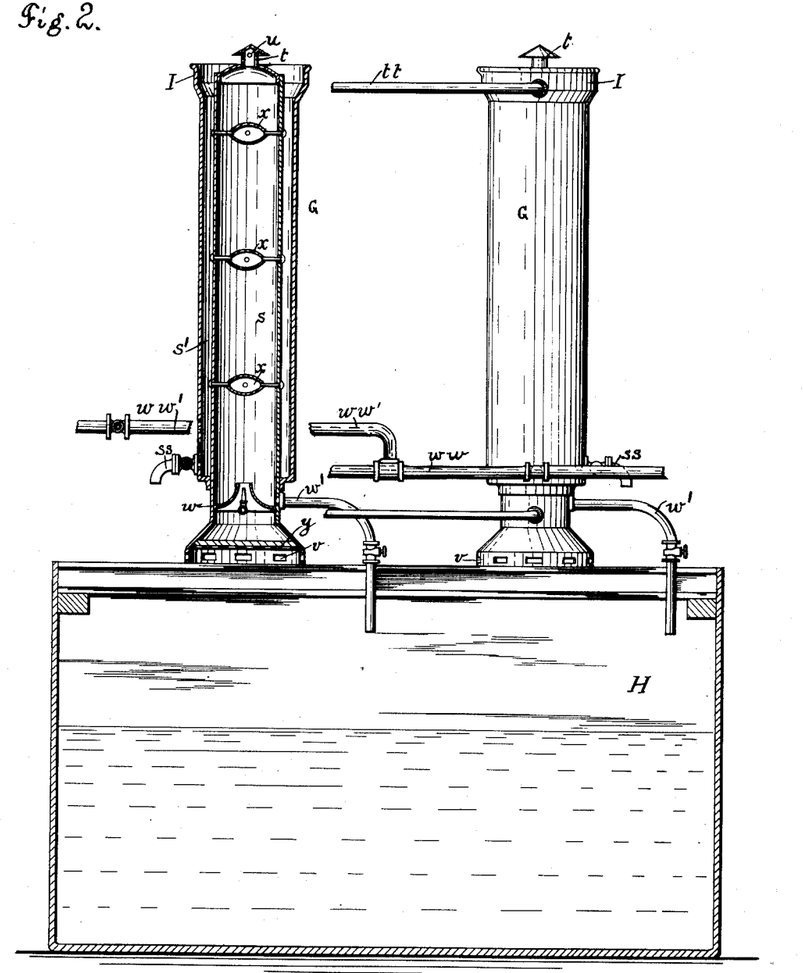
Fig. 2 is an elevation, partly sectional view, of the condensers.

The process of distilling water in my improved apparatus as hereinbefore described is carried on as follows: First, the flow of the water from a tank or pump through pipe $w\,w$ is started, the cock in the pipe $w\,w'$ being closed. The water thus flows into jackets $s'$ Fig. 2 and after they are filled overflows into pipe $t\,t$ and into the feed water receptacle B and from there into boiler A. Then the fire is started underneath the boiler A. When sufficient pressure of steam is obtained in the boiler, valve $d^3$ is opened the steam generated in the boiler A is admitted through pipes $d^2$, $d'$ and $d$ into the coil $c$ and pipes $c'$ and $f$. The valve in the pipe $w\,w'$ is then opened and the water from the supply pipe $w\,w$ allowed to flow through pipes $g$, $g'$ and $g^2$ into receptacle F, and from there through pipe $h$ into evaporator C. When the water reaches the required level in the evaporator C, valve $k$ in the receptacle is automatically closed. Then the cock is turned to shut off the flow through pipe $w\,w'$ and the operation of the apparatus is started.

The steam in the coil $c$ condenses at about the same ratio as the water is being evaporated in the evaporator C. The water, resulting from this condensation, passes through steam trap E into pipes $g$, $g'$ and $g^2$ and thence into the feed apparatus F by means of which the water in the evaporator C is steadily maintained at a predetermined level, preferably not more than two inches above the upper layer of coil $c$. The vapors produced in the evaporator C pass through the filter provided in the dome D of the evaporator into the vapor conduit $z$ and from it into the condensers G. The filter eliminates from the vapors a large proportion of impurities. Whatever gases and vapors of volatile liquids may yet be contained in the vapors are eliminated in the condensers where the vapors of water are also aerated and condensed. The product of this condensation, the pure distilled water, accumulates in the recess formed by flange $w$, whence it is withdrawn through pipe $w'$ and conducted into tank H or other receptacle.

If no loss of heat occurred in the evaporator C the quantity of water produced by condensation of steam in the steam coil $c$ would exactly equal the quantity of water evaporated. As this condition, however, is only theoretical and cannot be obtained in practice, the automatic apparatus for diverting the flow of the products of condensation from coil $c$ into the evaporator C must be provided to maintain the balance if the apparatus is to work automatically. This is also necessary to make the operation of the apparatus as economical. In place of such device for governing the supply of feed water to the evaporator as herein shown and described in connection with the feed water receptacle F some other device, constructed on those lines, or capable of performing its function, may be employed.

I claim as my invention:—

1. An apparatus for distilling water, comprising a boiler, means for charging the boiler with a supply of water, an evaporator, a steam coil in the evaporator; a conduit connecting the coil with the boiler, and a second conduit connecting the coil with the evaporator, means for holding the steam in the coil and for withdrawing only the condensed water from the coil, and for feeding it into the evaporator, and means for diverting the excess of the water from the feed water conduit; a condenser, a vapor conduit connecting the evaporator with the condenser, and means for withdrawing the product of condensation from the condenser.

2. An apparatus for distilling water, comprising a boiler, means for charging the boiler with a supply of water, an evaporator, a feed water receptacle and a conduit connecting it with the evaporator, a steam coil in the evaporator, a conduit connecting the coil with the boiler and a second conduit connecting it with the feed water receptacle for the evaporator, means for feeding the water from the receptacle into the evaporator and means for maintaining the feed water in the evaporator at a predetermined level by automatically diverting the flow of the feed water; a condenser, a vapor conduit connecting the evaporator with the condenser, and means for withdrawing the products of condensation from the condenser.

3. An apparatus for distilling water, comprising a boiler, an evaporator, a feed water receptacle and a conduit connecting it with the evaporator, a steam coil in the evaporator, a conduit connecting it with the boiler and a second conduit connecting it with the feed water receptacle for the evaporator; means for feeding the water from the receptacle into the evaporator and means for maintaining the feed water in the evaporator at a predetermined level by automatically diverting the flow of the feed water; a condenser, a vapor conduit connecting the evaporator with the condenser and means for withdrawing the products of condensation from the condenser; a water jacket surrounding the condenser, a water conduit connecting with the jacket and means for supplying water under pressure to the conduit; a second water conduit, from the water jacket to the boiler, and means for forcing the water from the conduit into the boiler.

4. An apparatus for distilling water, comprising a boiler, a feed water apparatus and a conduit connecting it with the boiler; an evaporator, a feed water receptacle and a conduit connecting it with the evaporator;

a steam coil in the evaporator, a conduit connecting it with the boiler and a second conduit connecting it with the feed water receptacle for the evaporator; means for feeding the water from the receptacle into the evaporator and means for maintaining the feed water in the evaporator at a predetermined level by automatically diverting the flow of the feed water; a condenser, a vapor conduit, connecting the evaporator with the condenser, and means for withdrawing the products of condensation from the condenser; a water jacket surrounding the condenser, a water conduit connecting with the jacket and means for supplying water under pressure to the conduit; a second water conduit, from the water jacket to the feed water receptacle for the boiler, and means for forcing the feed water from the receptacle into the boiler.

5. An apparatus for feeding the evaporator of a water distilling apparatus, with water derived from condensation of the steam used for evaporating the water in the evaporator, the apparatus comprising a steam coil set in the evaporator, a conduit connecting the steam coil with a steam generator; a second conduit connecting the steam coil with the evaporator, a steam trap, a valve chamber with an outlet, and a receptacle, all connected with the second conduit, intermediate between the steam coil and the evaporator, a valve in the outlet of the valve chamber and another valve between the valve chamber and the receptacle, a float in the receptacle and means for operatively connecting the float with the valves.

WALTER H. BARTHOLOMEW.

Witnesses:
JOHN A. POWER,
FREDERIC M. VERMILYE.